United States Patent
Millar

(10) Patent No.: US 8,083,984 B2
(45) Date of Patent: Dec. 27, 2011

(54) APPARATUS AND METHOD FOR CLOSE TOLERANCE FORMING OF AREAS IN FIBER REINFORCED RESIN COMPOSITE COMPONENTS

(75) Inventor: William James Trevor Millar, Ballyclare (GB)

(73) Assignee: Short Brothers PLC, Belfast (GB)

( * ) Notice: Subject to any disclaimer, the term of this patent is extended or adjusted under 35 U.S.C. 154(b) by 0 days.

(21) Appl. No.: 12/444,243

(22) PCT Filed: Oct. 4, 2007

(86) PCT No.: PCT/GB2007/003751
§ 371 (c)(1),
(2), (4) Date: May 20, 2009

(87) PCT Pub. No.: WO2008/040970
PCT Pub. Date: Apr. 10, 2008

(65) Prior Publication Data
US 2010/0163178 A1    Jul. 1, 2010

(30) Foreign Application Priority Data
Oct. 5, 2006    (GB) .................................. 0619667.9

(51) Int. Cl.
*B29C 51/10*    (2006.01)
(52) U.S. Cl. .......................... 264/511; 264/571; 264/277
(58) Field of Classification Search .......................... None
See application file for complete search history.

(56) References Cited

U.S. PATENT DOCUMENTS

| | | | |
|---|---|---|---|
| 4,065,340 A * | 12/1977 | Dickerson | ...................... 156/154 |
| 2006/0068170 A1 | 3/2006 | Hanson | |

FOREIGN PATENT DOCUMENTS

| | | |
|---|---|---|
| FR | 2 666 045 A1 | 2/1992 |
| FR | 2 763 882 A1 | 12/1998 |
| GB | 2 238 977 A | 6/1991 |
| GB | 2 316 036 A | 2/1998 |
| WO | 2004/041519 A1 | 5/2004 |

OTHER PUBLICATIONS

Translation of FR 2666045 (cited on ISR/Written Opinion of parent 371).*
European Search Report dated Feb. 11, 2008, PCT/GB2007/003751.
Great Britain Search Report dated Jan. 25, 2007, PCT/GB2007/003751.

* cited by examiner

*Primary Examiner* — Monica A Huson
(74) *Attorney, Agent, or Firm* — Thomas & Karceski, PC

(57) ABSTRACT

An apparatus and method for forming a fiber reinforced resin composite component by a resin transfer infusion (RTI) process in which a preform is laid up on a hard base tool and a bagging blanket is applied as a flexible upper tooling. Edge and/or other regions of the preform are superimposed by localized control plates which, together with spacer pins passing through the preform, serve to determine localized dimensional accuracy in the component without the need for hard upper tooling throughout.

37 Claims, 9 Drawing Sheets

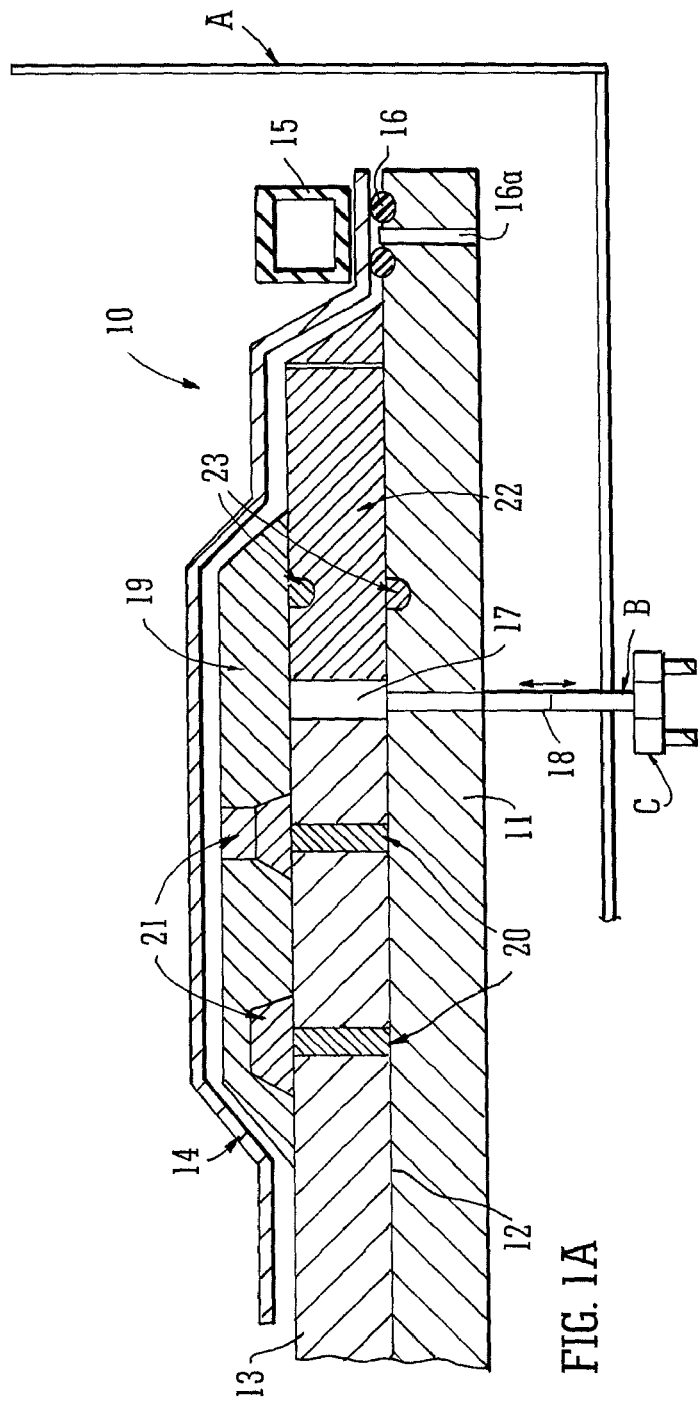
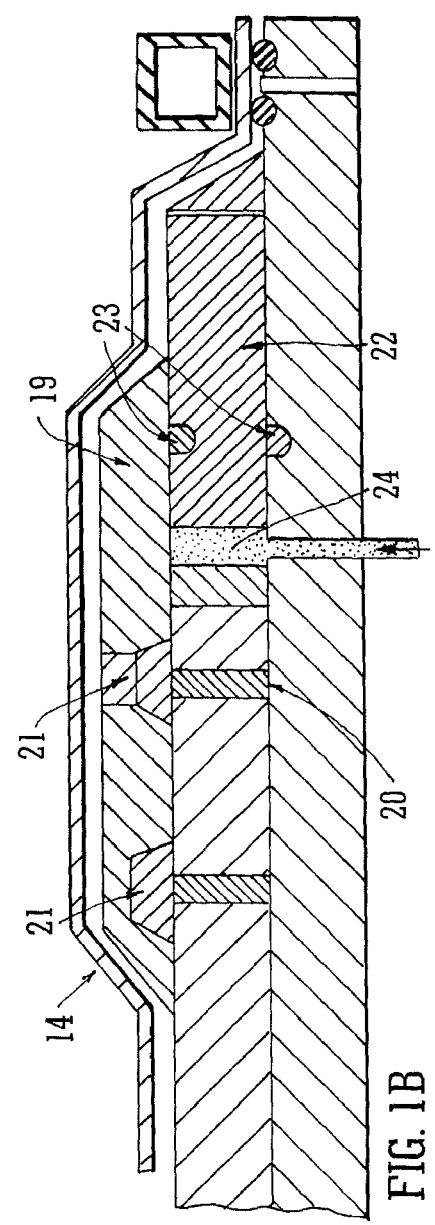
FIG. 1A
FIG. 1B

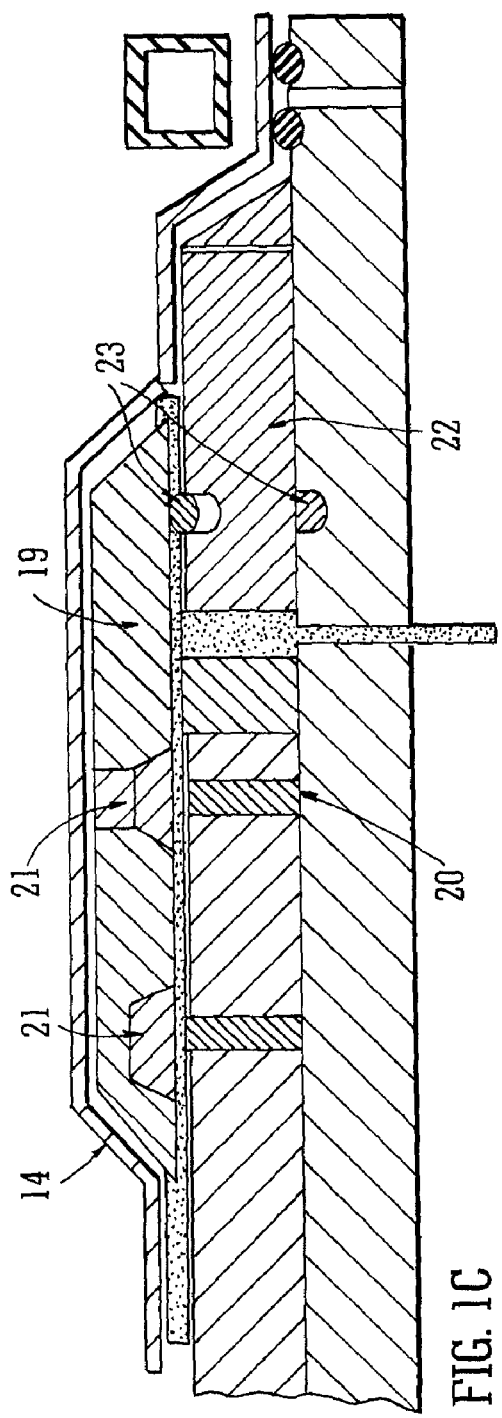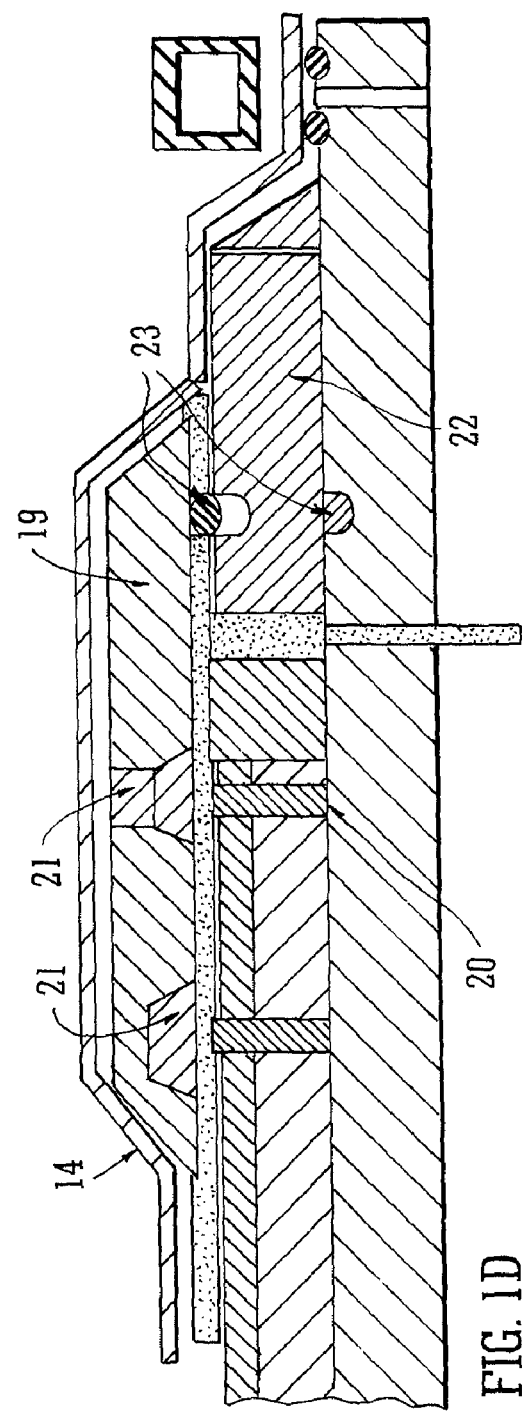

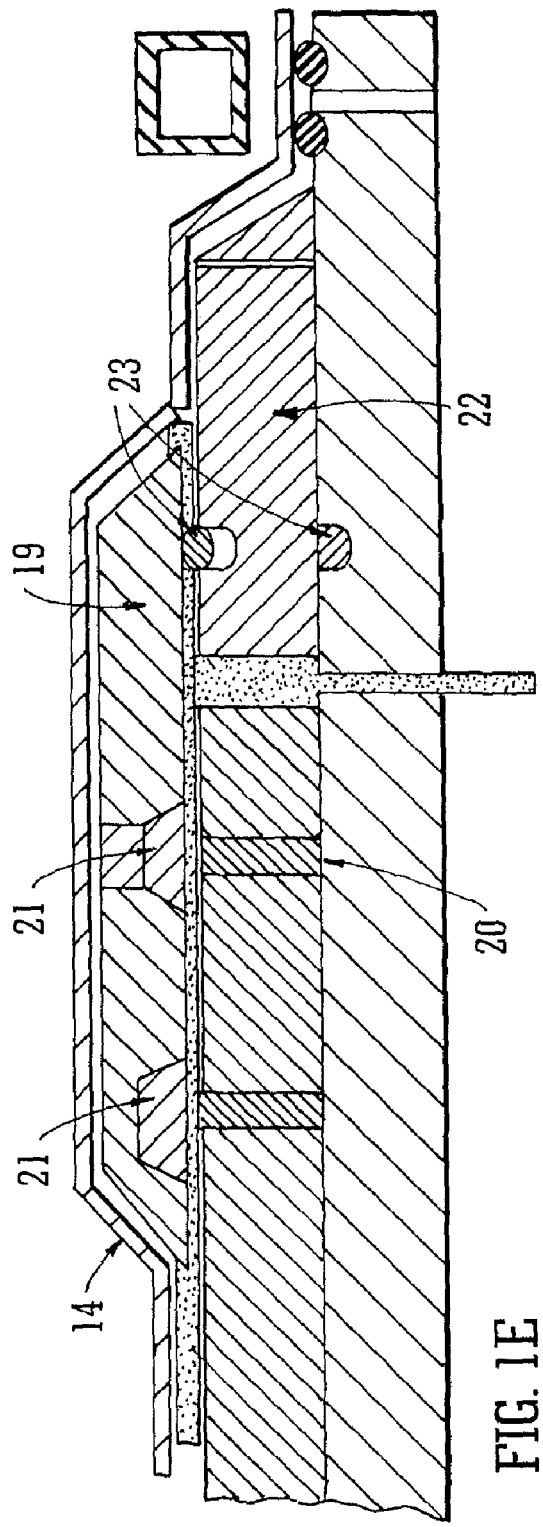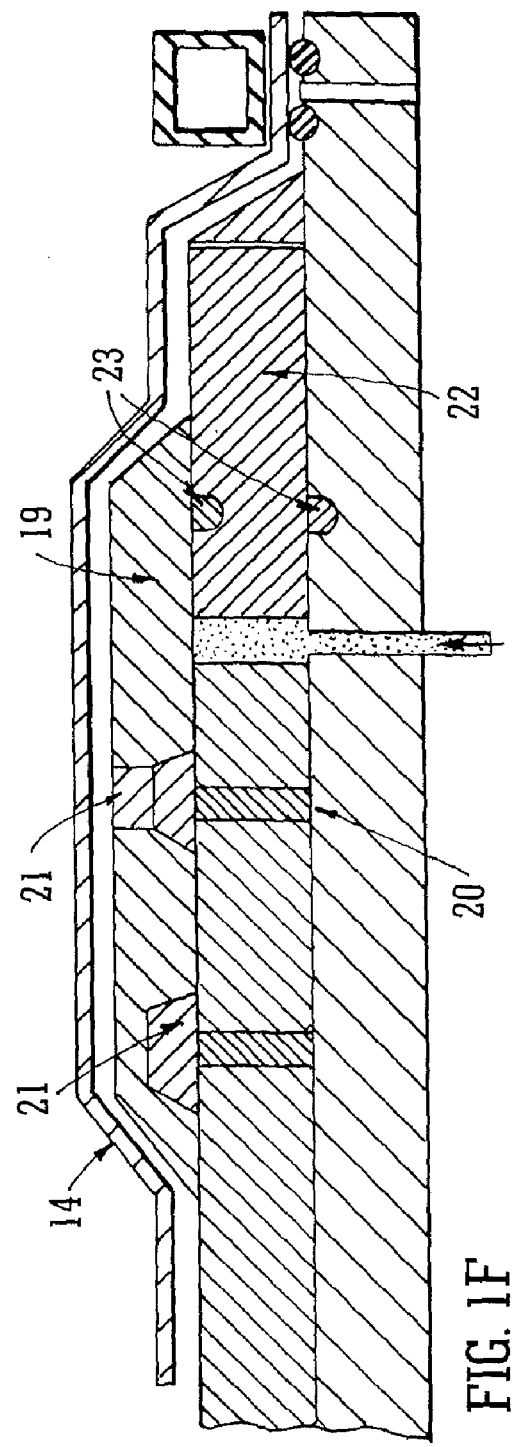
FIG. 1E
FIG. 1F

APPARATUS AND METHOD FOR CLOSE TOLERANCE FORMING OF AREAS IN FIBER REINFORCED RESIN COMPOSITE COMPONENTS

CROSS-REFERENCE TO RELATED APPLICATION (S)

This United States Non-Provisional Patent Application is a National Stage Entry that relies for priority on PCT Patent Application No. PCT/GB2007/003751, filed on Oct. 4, 2007, and also relies for priority on Great Britain Patent Application No. 0696667.9, filed on Oct. 5, 2006, the contents of both of which are incorporated herein by reference.

Field of the Invention

The present invention relates to the formation of fiber reinforced composite components in which a so-called preform in the form of a reinforcing fiber lay up assembly is subjected to liquid resin impregnation in a sealed enclosure whereby the resin is infused into the preform to produce the finished component.

Description of Related Art

Dimensional accuracy of the finished component may be critical in certain zones of the component, if not the entire component, where it is to interface with other components or objects such as, for example, in the assembly of aircraft wing structures in which high tolerance control is essential for dimensional accuracy without the need for expensive machining or shimming operations to correct any dimensional defects in the component.

Typically, the thickness of the component in, for example, an edge region, may be critical where the edge is to be secured to another member of the overall structure.

High dimensional accuracy in the formation of such components is achievable using a resin transfer moulding (RTM) resin infusion process which uses hard matched tooling to both faces of the tool. In this process a preform is impregnated with resin by firstly locating and compressing the preform in a mould cavity formed by upper and lower matched hard tooling parts. Liquid resin is then injected into the mould cavity under pressure with the intention of fully impregnating the preform. Sometimes the liquid resin is heated to reduce its viscosity thus to facilitate impregnation. The injection of liquid resin may be carried out with or without vacuum assistance.

Because of the hard tooling on both faces of the preform, the resin is injected edge-wise into the fibrous preform and must therefore infuse through the entire preform to achieve complete wet-out.

The limitations of the RTM process can be summarised as follows:
a) considerable costs are incurred for the two-part hard tooling, particularly for large components;
b) the dimensional accuracy of the finished component depends upon the compressibility of the fabric preform coupled with the tool stiffness, the machining accuracy of the tool, and the injection pressure
c) the time taken to ensure complete infusion of the preform may be outside the usable resin injection time;
d) the forces imposed upon the tooling edges can be high during tool closing leading to possible damage or thickness variation in the edge regions of the preform;
e) perfect matching of the upper and lower tools for sealing and high vacuum integrity of the tool can be difficult to achieve especially for complex and large components; and
f) unless the coefficients of thermal expansion of the tool parts and the preform are closely matched the dimensional accuracy may be compromised.

Thus, the RTM process is unsuitable in some instances, and particularly with large components. An alternative process known as resin transfer infusion (RTI) was developed as described in specification GB 2 316 036. In that case, a flexible, usually elastomeric bagging blanket cooperates with a single hard base tool to form the sealed enclosure. The preform is laid up on the base tool and the flexible blanket is applied over the preform, the whole assembly being placed in an autoclave; vacuum is applied to the area inside the bag to evacuate air from the preform. Liquid resin is then allowed to be drawn into the preform. The flexible upper tooling provided by the blanket helps facilitate resin infusion across the upper surface of the preform in contrast to the RTM process which permits largely edge infusion. Thus larger and more complex components can be formed using the RTI process.

However, the use of flexible upper tooling makes it difficult to attain accurate final thickness of the component since the flexible blanket takes up a final position dependent upon various factors, including:
a) the quantity of resin required;
b) the areal weight of the fabric;
c) the resin rheology, gel and cure characteristics;
d) the vacuum level in the preform prior to injection;
e) the resistance offered by the blanket and the external pressured applied; and
f) the wet-out efficiency of the fibrous preform.

These factors can create localised variation in thickness. The resistance offered by the blanket and preform, and indeed the resin, is a function of the compaction force required to compress the preform and the volume of resin injected.

In the RTM process the final part thickness is determined accurately by the cavity depth between the matched hard tooling, assuming that the preform can be compressed to the predetermined cavity thickness by the tool press. In the RTI process using flexible upper tooling, once the injection valve is closed, assuming total preform wet-out, the overall volume of the component is fixed due to the incompressibility of the resin. However, the thickness across the surface of the finished component can vary locally. Typically, areas which wet-out at an early stage in the process have a tendency to be slightly resin rich and hence of greater thickness than areas which wet-out only towards the end of the injection process. In zones of the component surface which do not have to interface with other structures in use, this variation may be acceptable, within limits, but at interface areas such variation could cause major problems in subsequent assembly operations. For example, if the component is too thick in the interface zone then machining may be required which is not only expensive and time consuming but also may degrade the structural integrity of the composite material in that zone. Conversely, if the component is too thin in the interface zone it may be necessary to fill the resultant gap using shimming techniques, again taking time with the possibility of degrading the structural integrity of the component in the interface zone.

These problems can lead to severe wastage of parts or the exclusion of RTI processing in the production of certain components for which the process would otherwise be suitable and advantageous.

SUMMARY OF THE INVENTION

It is an object of the present invention to provide a process and apparatus incorporating an RTI process whilst avoiding or mitigating the problems previously mentioned.

According to a first aspect of the present invention there is provided apparatus for forming a fiber reinforced resin composite component comprising a hard base tool which presents a tool face having a lay up region for lay up of a reinforcing fiber preform, a flexible bagging blanket for overlying the lay up region and cooperating with the tool face to form a sealed enclosure which encloses the reinforcing fiber preform, a liquid resin source and a liquid resin inlet which communicates with the sealed enclosure and which is connected to the liquid resin source for injection of liquid resin into the sealed enclosure to form a liquid resin/reinforcing fiber preform system for liquid resin impregnation of the reinforcing fiber preform; characterised by at least one rigid control plate adapted in use to be located in at least one zone within the sealed enclosure such that at least one part of the preform is disposed between the control plate and the hard base tool; and by at least one spacer of known dimension adapted to be located within or against the preform in said at least one zone and between the control plate and the hard base tool thus to determine the equivalent dimension of the preform and thus the finished component in said zone.

The resin injection port may be disposed such that resin injected into the sealed enclosure may act directly upon an outer edge region of the preform and an adjacent surface of the control plate thus to cause resin to flow across a face of the preform.

The apparatus may include a vacuum outlet which communicates with the sealed enclosure and which is adapted in use to be connected to vacuum generating means to create at least a partial vacuum within the sealed enclosure.

The liquid resin inlet and the vacuum outlet may be a single port, with selective valving.

The single port may be directed through the hard base tool in said zone.

The or each rigid control plate may include at least one reinforcing insert so disposed as to coincide with said at least one spacer such that compression forces imposed on the control plate by the spacer are at least partially borne by the reinforcing insert.

The or each spacer may be in the form of a pin of predetermined length extending through the preform to determine the thickness of the component in said zone.

The or each spacer may be of a material of greater hardness than that of the control plate.

The or each spacer may be permanently inserted within the preform.

The or each spacer may be removably inserted within the preform.

At least one periphery bar may be disposed between the hard base tool and the control plate thus to lie adjacent but spaced from an edge region of the preform to define a cavity in the sealed enclosure communicating with the liquid resin inlet.

Location means may be provided to determine the relative positions of the control plate, the periphery bar and the hard base tool.

Means may be provided to sealingly engage an outer peripheral area of the flexible bagging blanket with a face of the hard base tool.

The apparatus may be in combination with an autoclave adapted to contain and enclose the hard base tool, the preform and the flexible bagging blanket.

A resin distribution mesh may be superimposed between the or each control plate and the platform.

A resin distribution network may be machined into the surface of the or each control plate to be disposed adjacent the preform.

The flexible bagging blanket may be of increased stiffness in a region above the or each control plate.

Clamping means may be provided to maintain the control plate in contact with the spacer.

At least one groove may be provided in the lower face of the or each control plate for conduction of resin across the adjacent surface of the preform to areas away from the control plate.

According to a second aspect of the present invention a method of forming a fiber reinforced resin composite component comprises the steps of providing a hard base tool presenting a tool face having a lay up region, laying up a reinforcing fiber preform in said lay up region, overlaying the preform with a flexible bagging blanket to form, with the preform and the hard base tool a sealed enclosure, injecting a liquid resin into the sealed enclosure to form a liquid resin/reinforcing fiber preform system for liquid resin impregnation of the reinforcing fiber preform, externally pressurising the sealed enclosure and controlling the temperature thereof to cure the resin and form the component; characterised by the steps of introducing, prior to injection of the liquid resin, at least one rigid control plate in at least one zone within the sealed enclosure thus to lie between the preform and the flexible bagging blanket in said zone and locating at least one spacer of known dimension within or adjacent the preform in said zone and between the control plate and the hard base tool thus to determine the equivalent dimension of the preform and thus the finished component in said zone.

The resin injected into the sealed enclosure may be caused to act directly upon an outer edge region of the preform and an adjacent surface of the control plate to cause the control plate to lift away from the preform and allow resin to flow across a face of the preform.

The sealed enclosure may be heated and externally pressurised prior to resin injection.

The externally pressurised sealed enclosure may be externally depressurised prior to resin injection.

Surplus liquid resin may be ejected from the sealed enclosure.

The sealed enclosure may be externally re-pressurised prior to ejection of surplus resin.

The sealed enclosure may be further externally pressurised and its temperature increased subsequent to ejection of surplus resin, its external pressure and temperature being maintained during curing of the resin to form the component.

The sealed enclosure may be at least partially evacuated by vacuum generating means prior to resin injection.

The or each spacer may remain in the preform after formation of the component.

The or each spacer may be removed from the preform after formation of the component.

At least one periphery bar may be placed in the sealed enclosure prior to resin injection thus to lie between a part of the hard base tool and a part of the control plate and adjacent but spaced from an edge region of the preform to define a cavity in the sealed enclosure to receive the injected liquid resin.

The hard base tool and flexible bagging blanket enclosing the preform may be heated, pressurised and depressurised in an autoclave, the liquid resin being ducted to and from the enclosure through the shell of the autoclave.

The preform may be partially drilled to receive said at least one spacer while laid up and maintained in a desired position on the hard base tool, the preform being then raised from the tool thus to avoid damage to the tool while drilling is completed.

The control plate may be pre-drilled to receive a drill bush through which a drill passes subsequently to drill the preform.

During resin injection the or each control plate may be caused to lift away from the preform to allow resin to flow across the adjacent face of the preform. Alternatively, the or each control plate may be prevented from lifting away from the preform.

BRIEF DESCRIPTION OF THE DRAWINGS

An embodiment of the invention will now be described, by way of example only, with reference to the accompanying drawings, in which:

FIG. 1(a) is a schematic cross-sectional representation of a part of an apparatus for forming a fiber reinforced resin composite component in accordance with the invention;

FIG. 1(b) is a similar view of the apparatus during a first phase of a forming operation;

FIG. 1(c) is a similar view of the apparatus during a second phase of a forming operation;

FIG. 1(d) is a similar view of the apparatus during a third phase of a forming operation;

FIG. 1(e) is a similar view of the apparatus during a fourth phase of a forming operation;

FIG. 1(f) is a similar view of the apparatus during a fifth phase of a forming operation;

FIG. 1(i) is a similar view of the apparatus with a further modification;

DETAILED DESCRIPTION OF EMBODIMENT(S) OF THE IVENTION

Figure 1G:
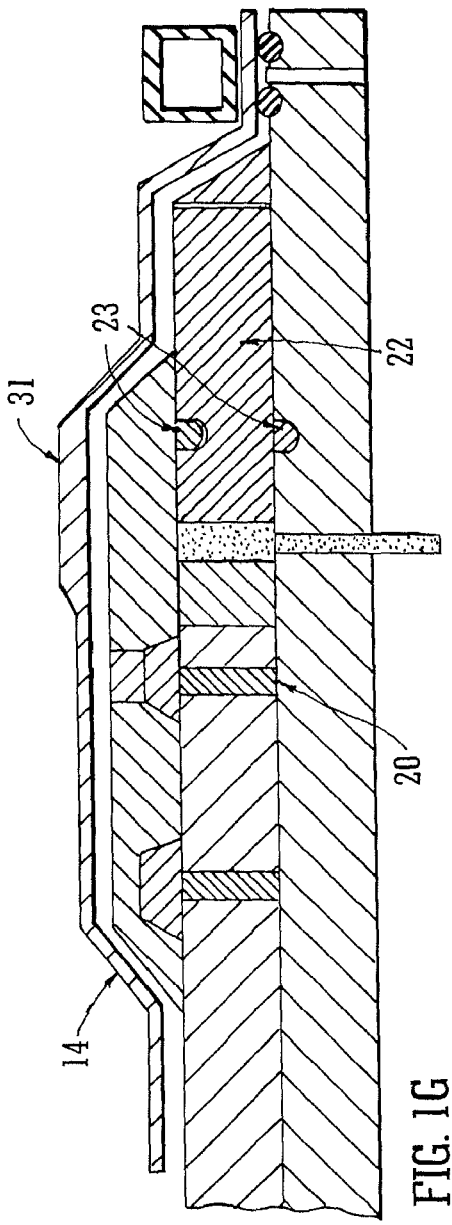
FIG. 1(g) is a similar view of the apparatus with a modification.
Figure 1H:
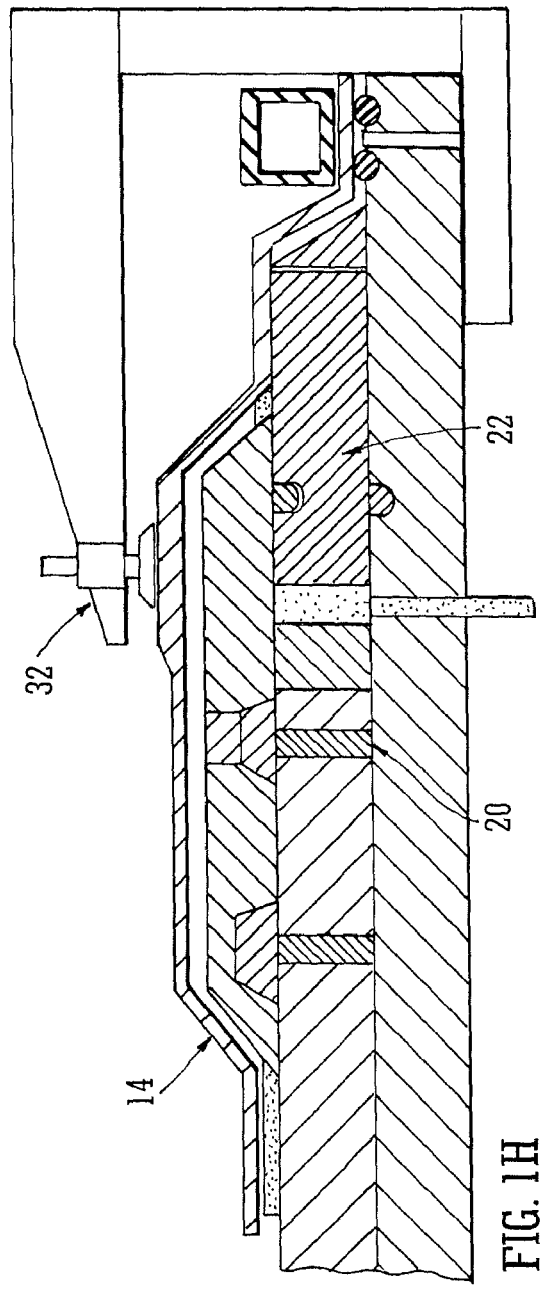
FIG. 1(h) is a similar view of the apparatus of FIG. 1(g) and incorporating a clamping device.
Figure 11:
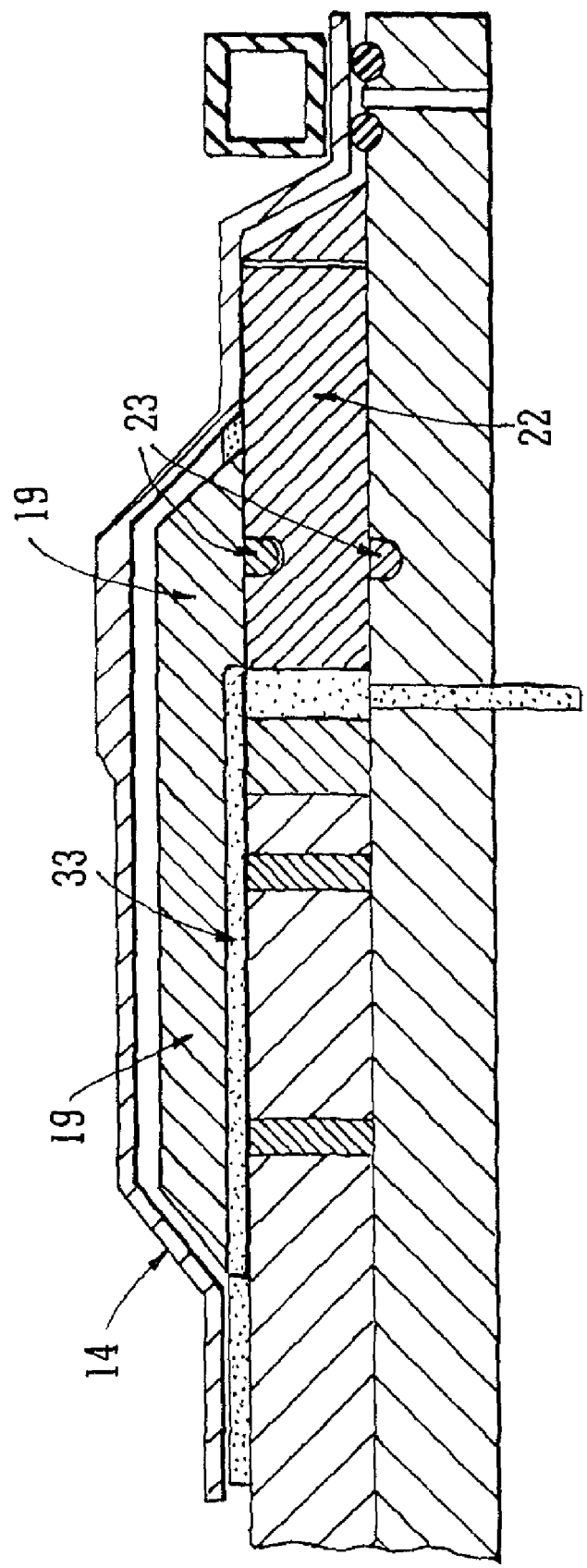

In Resin Transfer Moulding (RTM), Resin Transfer Infusion (RTI) and other liquid resin moulding techniques, it is usually necessary initially to build up the shape of the component by the laying up of a dry preform. The dry preform consists of a multi-layer pack of fabric at the required orientations formed to the component shape under heat and pressure. The fabric usually comes with its surface covered with fine adhesive particles, known as binder, applied to one or both sides.

When the preform pack is heated the binder softens and becomes tacky and with the addition of pressure the preform layers are thus tacked together. When cooled, the binder hardens to give a relatively stiff preform.

In a complex structure, several parts can be separately preformed in advance and then placed together in a resin injection tool. For smaller components the preforming operation may take place in a dedicated preforming unit which typically consists of a heating source, a vacuum pump and rubber diaphragm. The diaphragm is lowered on to the preform and automatically seals around the edges, vacuum is applied underneath the rubber diaphragm causing the layers of the preform to be compacted under vacuum pressure. The heating source is then turned on and the preform heated to the temperature required to soften the adhesive binder causing the layers to be bonded together. The preform is cooled under vacuum and then removed from the unit as a relatively stiff object.

Typically a number of separate preforms will be made in this way and then set up together in an injection tool ready for injection.

For larger components the preforming operation can take place in the injection tool and within an autoclave. This operation usually involves the fabric layers being placed on the tool surface and then covered not with the flexible upper tooling to be used during the subsequent resin injection but with a high temperature plastic sheeting known as 'bagging film'. Vacuum is then applied to the tool, the autoclave pressurised and the tool heated up in the autoclave to the preforming temperature. The flexible upper tool is not used in this preforming operation because for the subsequent injection other separately manufactured preforms may need to be added to make the final component. For example, in the production of a wing skin, the skin and stringer preforms would be produced separately and then combined for the final resin injection.

Referring now to the drawings, an apparatus 10 according to the first aspect of the invention comprises a mould assembly having a hard base tool 11 which presents a tool face having a lay up region 12 on which a reinforcing fiber lay up assembly in the form of a preform 13 is laid up, and an elastomeric bagging blanket 14 which overlies the preform 13 and sealingly cooperates with the tool face at its outer peripheral edges by way of vacuum seals 15, 16 connected to a vacuum pump via a port 16a to provide a sealed enclosure 17 which encloses the preform 13.

The elastomeric bagging blanket 14 is formed from an elastomer material incorporating a fibrous web to provide a flexible but durable blanket through which pressure is applied to the preform in the formation of the composite component about the configuration of the hard base tool 11.

It will be appreciated that the drawings are schematically presented to illustrate a part of the apparatus which, for the purpose of this description, may be considered to be a peripheral region. Around the apparatus a plurality of ports 18 are provided which communicate with the interior of the sealed enclosure 17. A vacuum generating pump may be connected to each of the ports 18 to evacuate the interior of the enclosure 17 thus to draw the blanket 14 down and around the preform 13 in the formation of the component. The ports 18, as will be described, also provide for the injection of a liquid resin to be incorporated into the preform and cured to form the finished component.

The foregoing description explains how a combination of hard base tool 11 and flexible bagging blanket 14 may be used in an RTI process to form a component but that such a process cannot always guarantee accuracy of thickness of the finished component, particularly in the edge regions where the component is to receive means for attachment to another object or structure.

Thus, in accordance with the present invention, the apparatus includes one or more control plates 19 of a rigid material which provide localised upper hard tooling surfaces located under the flexible bagging blanket 14 and which may be attached to the underside thereof.

In the example illustrated, it may be assumed that the edge zone of preform 13 is subsequently to receive attachment fixings through a number of apertures extending through the preform. Therefore, a plurality of spacers 20 which, in this example, are formed as stop pins, are inserted into the preform, as will be described, beneath the associated control plate 19. The pins 20 must have sufficient strength to sustain a load applied to the control plates 19 by ambient autoclave pressure. Also, the pins 20 must be of a hardness not significantly greater than that of the control plates 19, and base tool 11, to ensure that these are not damaged. The length of the pins 20 will be manufactured to a finer tolerance than that required by the other components of the apparatus in that zone. Thus, a cavity of accurate depth is created between the hard base tool 11 and the control plate 19.

In circumstances when the hardness differential between the spacer pins 20 and control plate 19 warrant it, and aligned metallic inserts 21 are inserted into the control plate 19 to withstand the compression forces applied by the pins 20 during the forming process. These inserts 21 are of sufficient hardness to withstand localised high compression forces applied by the adjacent pin ends.

Surrounding the assembly, within the sealed enclosure 17 and partially disposed between the base tool 11 and control plates 19, are a plurality of periphery bars 22 which assist in the accurate positioning and support of the control plates 19 above the surface of the tool. Location pegs and recesses 23 are provided to ensure the exact lateral location of the periphery bars with respect to the adjacent regions of the tool 11 and the control plates 19. An inner peripheral edge of each periphery bar 22 serves to define a space within the sealed enclosure 17, which is in direct communication with the associated port 18.

The hard base tool 11 and the periphery bars 22 may be of any material of sufficient hardness, such as steel. The or each control plate 19 may be of a metallic or composite material and of sufficient rigidity to avoid distortion during the forming process. The spacer pins 20 may be of a material such as titanium or could be of a composite material such as pultruded carbon. The inserts 21, which will be required if the control plate 19 is of a composite material, will be of a harder material such as steel.

There will now be described a typical sequence of operational steps to be carried out during the RTI process which takes place within an autoclave A with a pipeline B connecting the mould assembly inside the autoclave, in this example via a three-way valve C, selectively to a resin injection vessel and vacuum pump (not shown) located outside of the autoclave, the pipeline B passing through the shell of the autoclave. The autoclave is used to heat the preform and cure the resin.

The interior of the autoclave and thus the exterior of the mould assembly, is initially heated to an optimum temperature, for the resin system being used. An injection temperature that is too high will give a resin usable life that is too short, whereas an injection temperature that is too low will give a resin viscosity level that is too high with the result that, in both cases, the preform will not be fully 'wetted out'. For example, for single component epoxy resin systems used for aerospace applications, autoclave A is typically heated so that apparatus 10 is at a temperature in the 115° C. to 125° C. range, preferably around 120° C. During this heat-up stage the autoclave is pressurised to assist in the rapid heating of the assembly and ports 18 are connected by valve C to the vacuum pump. Care must be taken to ensure that the autoclave pressure is not so high that it over compacts preform 13, thus making it difficult to infuse with resin, or causes damage to control plates 19, space pins 20 and/or tool 11. When the assembly has reached the required temperature then the autoclave is depressurised and the valve C is actuated to disconnect the ports 18 from the vacuum pump and to connect them to the resin injection vessel. Liquid resin is then injected into the sealed enclosure 17 as can be seen in FIG. 1(*b*) where the resin is shown at 24.

FIG. 1(*c*) illustrates how the resin injected into the sealed enclosure may lift the control plate 19 sufficiently to allow the resin to flow across the upper surface of the preform 13 while the location pegs 23 maintain the lateral position of the control plate above the preform.

FIG. 1(*d*) illustrates the impregnation of the resin into the upper regions of the preform, and FIG. 1(*e*) shows a stage where the preform is completely "wetted out", ie, impregnated with the resin. At this point in the process it may be necessary to remove surplus resin and so the autoclave is re-pressurised to force the blanket 14 onto the control plates 19 and the preform 13, thus to eject the surplus resin. The pressure used should be high enough to assist in both the ejection of the surplus resin before its hardening and in the return of the control plates 19 against the spacer pins 20, but not so high so that the control plates 19 and/or the space pints 20 are damaged.

FIG. 1(*f*) shows the condition when the preform is fully impregnated and surplus resin has been completely ejected, with the control plates 19 seated firmly on the spacer pins 20 giving the correct preform thickness in the region of the pins.

In this condition the autoclave pressure and temperature are increased to the values required for curing the resin system. The assembly remains in the autoclave under these conditions while the resin is cured for the period of time sufficient to cure the resin. For example, for single component epoxy resin systems used for aerospace applications, the autoclave A is typically heated and pressurised so that apparatus 10 is at a temperature in the 175° C. to 185° C. range, preferably around 180° C., and under a pressure in the 586 kPa to 655 kPa range, preferably around 620 kPa, for a period of time within a 2 hour to 2½ hour range, preferably around 2 hours.

FIG. 1(*g*) shows the provision of extra thickness or stiffening 31 around a peripheral region of the blanket 14 which serves to clamp the control plates 19 down on the pins 20 and prevent the control plates from being lifted during the resin infusion process.

For additional retention of the control plates, clamping means such as shown at 32 in FIG. 1(*h*) may be used.

Stiffening 31 and/or clamping means 32 are provided when it is anticipated that the control plates 19 will not substantially seat firmly on the spacer pins 20 at the end of the process.

By clamping down the control plates in this way, excess resin will be distributed to areas away from the control plates.

FIG. 1(*i*) shows how large grooves 33 may be provided in the lower faces of the control plates 19 away from the spacer pins 20, which serve to conduct resin rapidly to areas away from the control plates, where only flexible tooling is present. Grooves 33 also assist in alleviating the wet-out deficiencies inherent in the areas where stiffening 31 and/or clamping means 3 are utilised.

The period during which the resin is infused into the preform depends upon the volume of the preform and its complexity of shape, as well as the viscosity of the resin, which can be adjusted to some extent by controlling its temperature.

Preferably, the weight and/or volume of resin subsequently ejected as surplus from the enclosure is monitored thus to determine that the preform has become completely impregnated.

The quantity of resin injected into the enclosure may be predetermined by weight or volume, or alternatively the injection may continue until the flow rate of the resin decreases indicating that the enclosure is approaching, or has attained, its full capacity, at a predetermined ambient pressure within the autoclave.

Figure 1J:
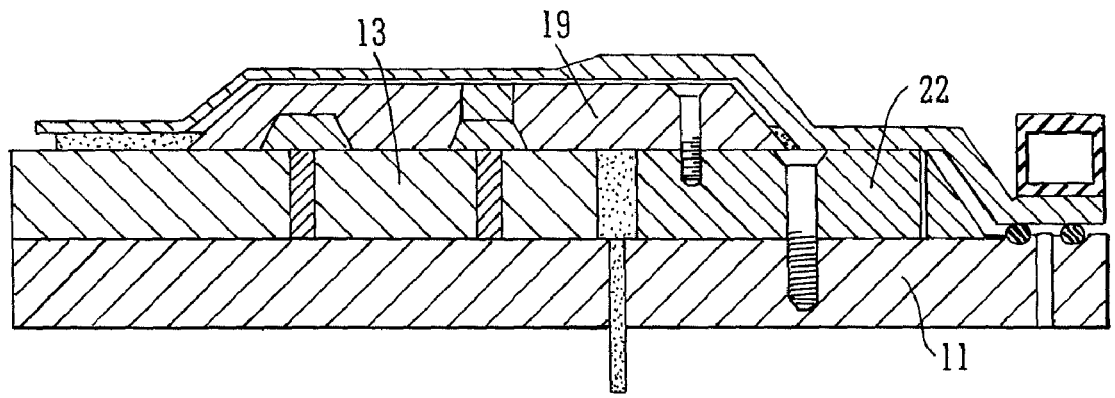
FIG. 1(j) illustrates a first alternative method of assembly of the apparatus.

Referring now to FIG. 1(j) the assembly of the periphery bars and control plates may be carried out by bolting the periphery bar 22 to the hard base tool 11 and then bolting the control plate 19 to the periphery bar. In this case, the control plate is prevented from lifting from the surface of the preform 13. The bolts may replace or be in addition to the location pegs 23. Fastening of the parts together in this way can only be carried out in two adjacent regions because of potential thermal expansion.

Figure 1K:
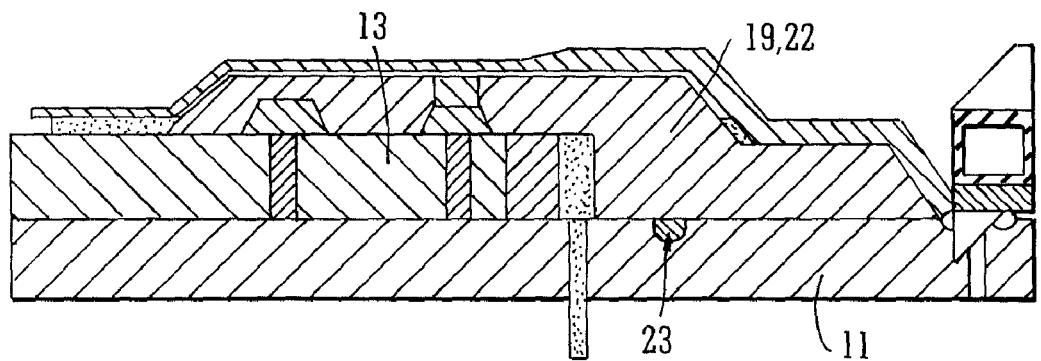
FIG. 1(k) illustrates a second alternative method of assembly of the apparatus.

FIG. 1(k) shows a further alternative where the periphery bar and control plate are of integral construction.

Figure 1L:
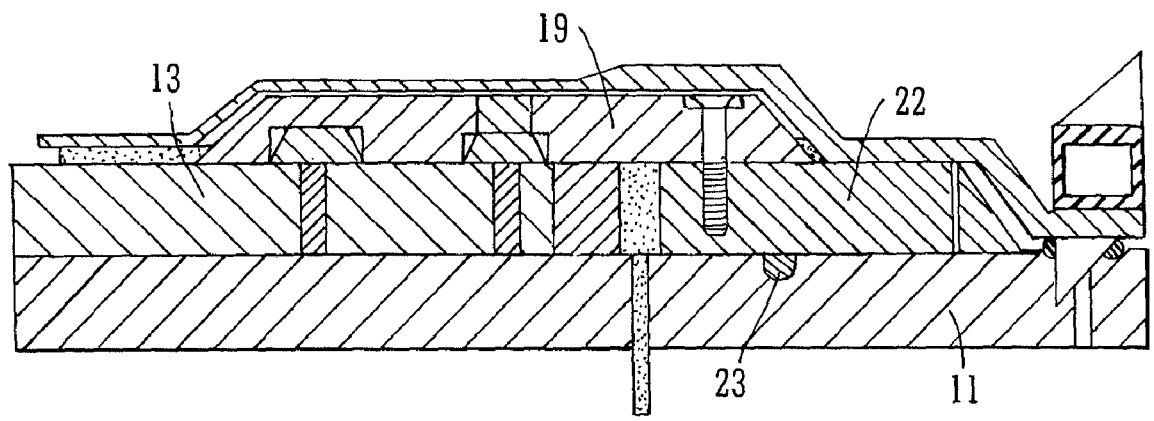
FIG. 1(l) illustrates a third alternative method of assembly of the apparatus.

FIG. 1(l) shows the periphery bar positioned by the location peg 23 while control plate 19 is bolted to the periphery bar. In this example and indeed in the example of FIG. 1(j) the periphery bars and control plates shall be of the same material or of a material with similar thermal expansion properties.

Figure 1M:
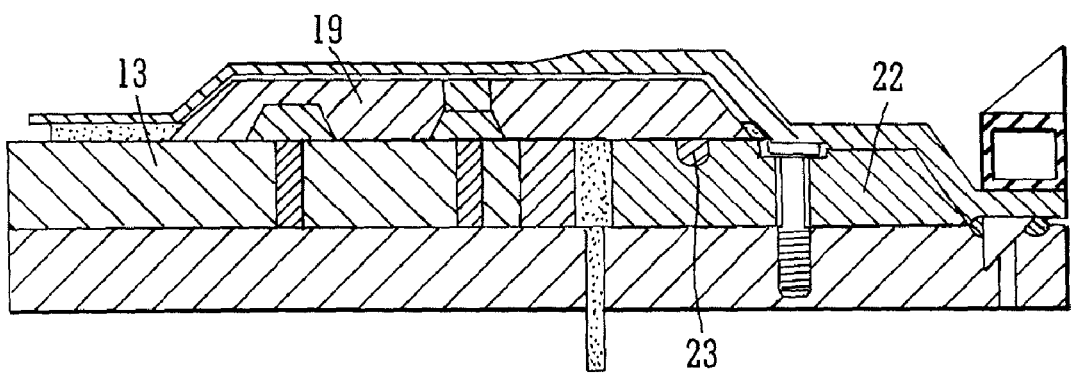
FIG. 1(m) illustrates a fourth alternative method of assembly of the apparatus.

FIG. 1(m) shows the further alternative of bolting the periphery bar to the base tool while relying on a location plate 23 for positioning of the control plate.

If the periphery bars cannot be of the same material as the base tool then special provision must be made to accommodate different expansion rates between the tool and the periphery bar. For example, each periphery bar can be shortened with an elastomeric joint between adjacent periphery bars to accommodate differential expansion. Similarly, with the control plates ideally they should be of the same material as the base tool but if this is not possible then again special provision must be made to accommodate different thermal expansion properties. For example, slotted holes may be provided in the control plates to allow for the expansion and contraction.

Figure 2:
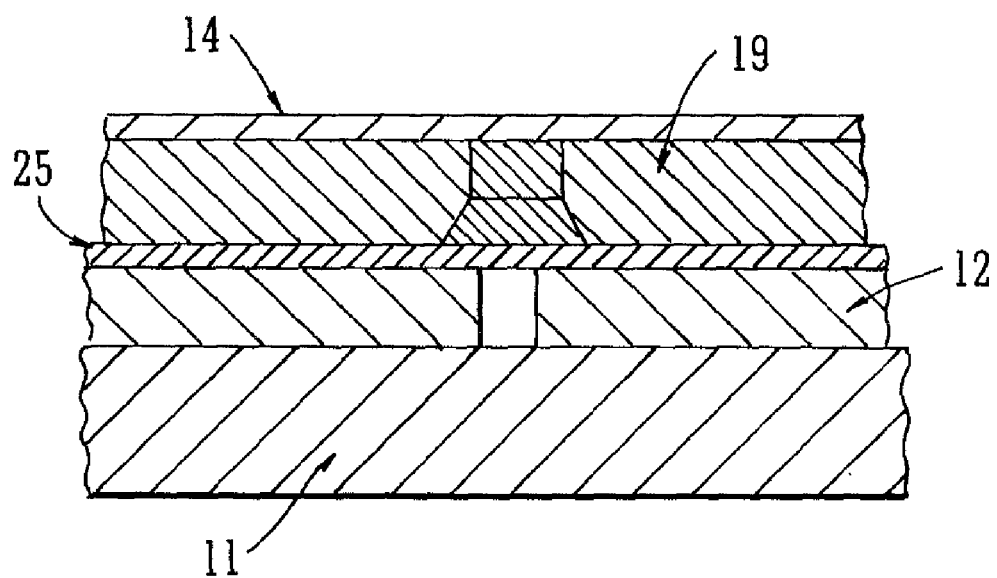
FIG. 2 shows a further detail of the apparatus.
Figure 3:
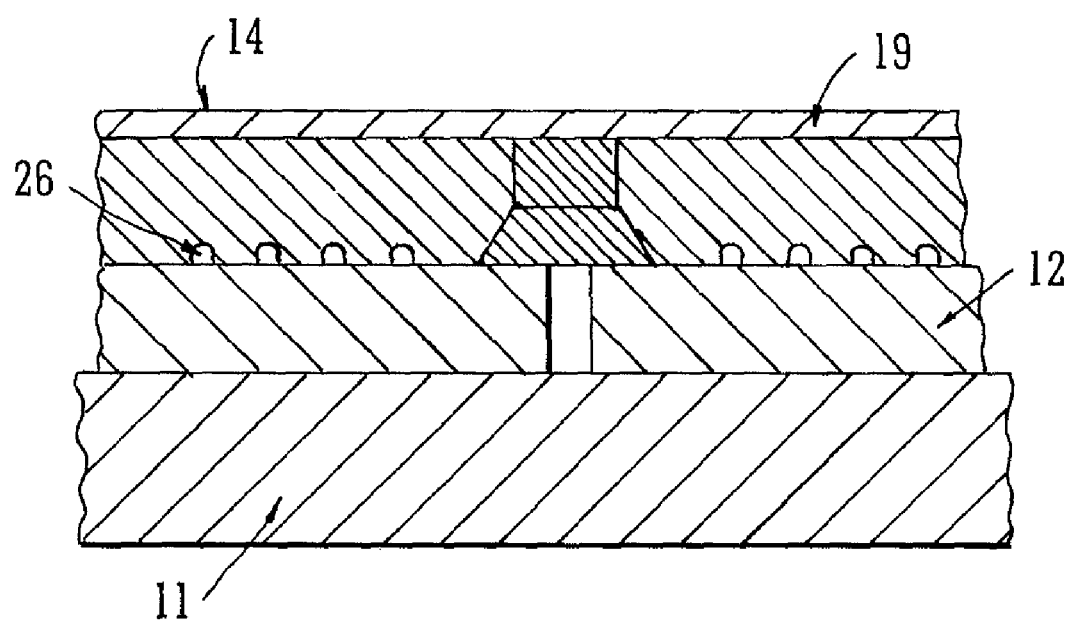
FIG. 3 shows an alternative further detail.

To ensure resin distribution across the surface of the preform, the control plates 19 may be placed on top of a resin distribution mesh illustrated at 25 in FIG. 2. Alternatively, as shown in FIG. 3, a resin distribution network 26 may be machined into the bottom surface of the control plate 19. These features will assist prevention of the control plates 19 from lifting during resin injection.

Lifting of the control plates 19 during resin injection may be tolerated, so long as they subsequently relocate in their correct positions owing to the pressure of the blanket 14 and the presence of the location pegs 23 and associated recesses.

However, it is preferable for the control plates to remain in position, thus minimising any risk of relocation error. This can be ensured by introducing the resin very slowly and directly into the preform. The provision of the large grooves 33, the stiffening 31 and/or the clamp 32 will assist in this regard.

The control plates 19 will not lift if restrained or if the resin pressure is insufficient to lift them. There are three possibilities. Firstly, there may be no ejection of excess resin when only the exact required amount of resin is injected to achieve the required thickness and fiber volume of the finished component. Secondly, a known quantity of excess resin may be injected. This is sometimes preferable as it can speed up the "wetting out" of the preform. Thirdly, an approximate quantity of excess resin may be injected and is subsequently ejected at a low autoclave pressure until the flow rate reaches zero or near to zero. In this case, the ejection pressure directly determines the final component thickness and ensures the correct thickness in the presence of the control plates. Applying such pressure to eject excess resin ensures that all of the excess is removed and that the control plates return to their initial position if they have been lifted away from the preform, but the pressure must not be so high as to cause damage to the preform or the base tool 11.

Figure 4:
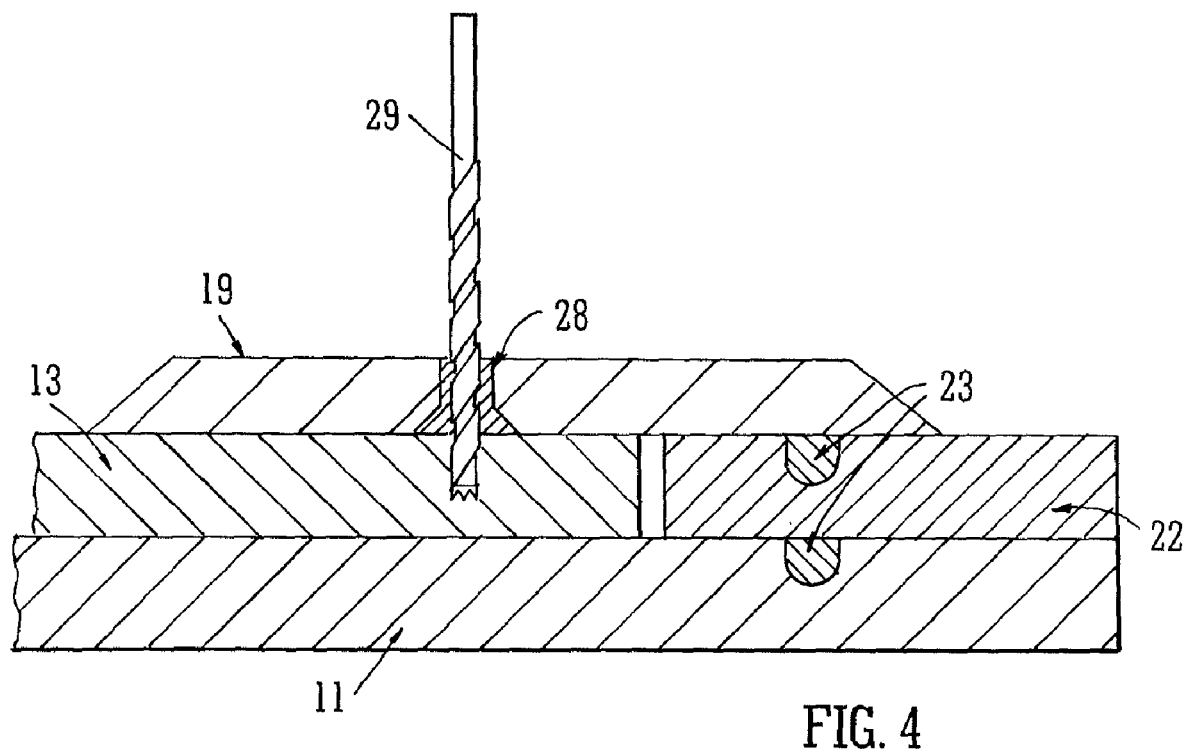
FIG. 4 shows a still further detail of the apparatus.

Referring now to FIG. 4, with the control plates 19 and periphery bars 22 accurately located on the tool base 11 by the location pegs 23, the preform 13 may be drilled to accept the spacer pins 20. In this example, a drill bush 28 is inserted into the control plate 19 to receive a drill 29 which is permitted only partially to penetrate the preform 13 thus to avoid damaging the tool.

Figure 5:
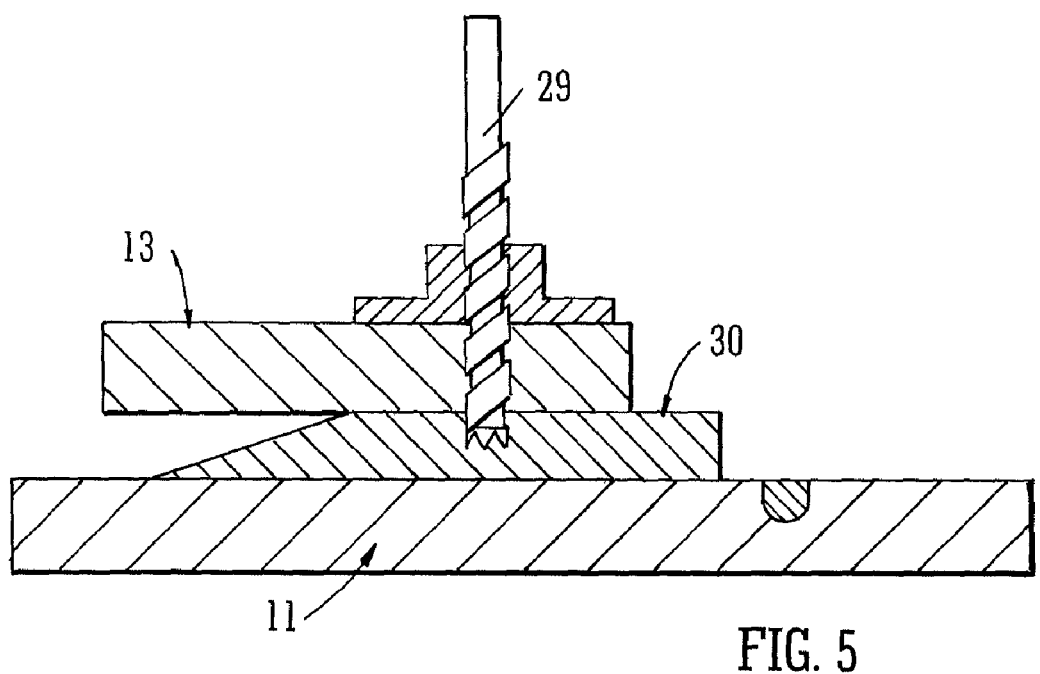
FIG. 5 shows a still further detail of the apparatus.

Subsequently, as schematically illustrated in FIG. 5, the preform 13 may be lifted from the tool surface by a wedge spacer 30 so that the preform 13 may be fully drilled out. After drilling of the preform, the pins 20 may be inserted and these can either remain in the finished component permanently to maintain the structural integrity of the component, or the pins can be knocked or drilled out subsequently to accommodate fixing bolts, rivets or the like for attachment of the component to another object or surface.

The number of spacer pins 20 used in any such process will be kept to a minimum to ensure that the associated control plate 19 will not deflect beyond specified limits, which ensures that the final component thickness is maintained within tolerable limits. Again, the material rigidity of the control plates will be determined such that any plate deflection will be minimised.

The periphery bars 22 may be bolted to the tool 11 if required.

The use of the spacer pins 20 within the preform, together with the rigid control plates 19, serves to create a dimensionally accurate cavity between the tool surface and the control plates, providing a significantly improved thickness accuracy in the finished component when compared with an RTI process in which the bagging blanket alone provides a wholly flexible upper tool.

It is not intended to limit the scope of the invention to the details described herein. For example, prior to resin injection, using a vacuum source may not be necessary in some cases where the pressure within the autoclave together with venting the enclosure to atmosphere may be adequate.

The invention claimed is:

1. An apparatus for forming a fiber reinforced resin composite component comprising:
    a hard base tool which presents a tool face having a lay up region for lay up of a reinforcing fiber preform,
    a flexible bagging blanket for overlying the lay up region and cooperating with the tool face to form a sealed enclosure which encloses the reinforcing fiber preform,
    a liquid resin source,
    a liquid resin inlet which communicates with the sealed enclosure and which is connected to the liquid resin source for injection of the liquid resin into the sealed enclosure for liquid resin impregnation of the reinforcing fiber preform,
    at least one rigid control plate adapted in use to be located in at least one zone within the sealed enclosure such that at least one part of the preform is disposed between the control plate and the hard base tool, and at least one spacer with a predetermined dimension adapted to be located within the preform in said at least one zone and between the control plate and the hard base tool.

2. The apparatus according to claim 1 wherein the resin injection port is disposed such that the resin injected into the sealed enclosure may act directly upon an outer edge region of the preform and an adjacent surface of the control plate thus to cause resin to flow across a face of the preform.

3. The apparatus according to claim 1 further comprising a vacuum outlet which communicates with the sealed enclosure and which is adapted to in use to be connected to a vacuum generator to create at least a partial vacuum within the sealed enclosure.

4. The apparatus according to claim 2 wherein the liquid resin inlet and the vacuum outlet comprise a single port and selective valving.

5. The apparatus according to claim 4 wherein the single port is directed through the hard base tool in said zone.

6. The apparatus according to claim 1 further comprising at least one reinforcing insert disposed within the control plate to coincide with said at least one spacer such that compression forces imposed on the control plate by the spacer are at least partially borne by the reinforcing insert.

7. The apparatus according to claim 1 wherein the spacer is in the form of a pin of predetermined length extending through the preform and determines the thickness of the component in said zone, the spacer being of a material of greater hardness than that of the control plate.

8. The apparatus according to claim 1 wherein the spacer is permanently inserted within the preform.

9. The apparatus according to claim 1 wherein the spacer is removably inserted within the preform.

10. The apparatus according to claim 1 further comprising at least one periphery bar disposed between the hard base tool and the control plate lying adjacent to an edge region of the preform and forming a cavity in the sealed enclosure communicating with the liquid resin inlet.

11. The apparatus according to claim 1 including at least one positioner to determine the relative positions of the control plate and the hard base tool.

12. The apparatus according to claim 1 including a seal to sealingly engage an outer peripheral area of the flexible bagging blanket with a face of the hard base tool.

13. The apparatus according to claim 1 further comprising a resin distribution mesh superimposed between the control plate and the preform.

14. The apparatus according to claim 1 including a resin distribution network machined into a surface of the control plate adjacent to the preform.

15. The apparatus according to claim 1, in which the flexible bagging blanket is of increased stiffness in a region above the control plate.

16. The apparatus according to claim 1, including a clamp to maintain the control plate in contact with the spacer.

17. The apparatus according to claim 1 including at least one groove in the lower face of the of the control plate for conduction of resin across the adjacent surface of the preform to areas away from the control plate.

18. The apparatus according to claim 1, further comprising an autoclave adapted to contain and enclose at least the hard base tool, the preform and the flexible bagging blanket.

19. A method of forming a fiber reinforced resin composite component comprising:
on a hard base tool presenting a tool face having a lay up region, laying up a reinforcing fiber preform in said lay up region,
overlaying the preform with a flexible bagging blanket to form, between the flexible blanket and the hard base tool, a sealed enclosure enclosing the preform,
inserting at least one rigid control plate in at least one zone within the sealed enclosure,
locating at least one spacer within the preform between the control plate and the hard base tool,
injecting a liquid resin into the sealed enclosure to form a liquid resin/reinforcing fiber preform system for liquid resin impregnation of the reinforcing fiber preform,
externally pressurizing the sealed enclosure, and
controlling the temperature of the sealed enclosure to cure the resin and form the component.

20. The method according to claim 19 wherein the resin injected into the sealed enclosure is caused to act directly upon an outer edge region of the preform and an adjacent surface of the control plate to cause resin to flow across the face of the preform.

21. The method according to claim 19 wherein the sealed enclosure is heated and externally pressurized prior to resin injection.

22. The method according to claim 21 wherein the externally pressurized sealed enclosure is externally depressurized prior to resin injection.

23. The method according to claim 19 wherein surplus liquid resin is ejected from the sealed enclosure.

24. The method according to claim 22 wherein the externally depressurized sealed enclosure is externally re-pressurized prior to ejection of surplus resin.

25. The method according to claim 24 wherein the sealed enclosure is further externally pressurized and its temperature increased subsequent to ejection of surplus resin, its increased external pressure and temperature being maintained during curing of the resin to form the component.

26. The method according to claim 19 wherein the sealed enclosure is at least partially internally evacuated by a vacuum generator prior to resin injection.

27. The method according to claim 19 wherein the spacer remains permanently located in the preform after formation of the component.

28. The method according to claim 19 wherein the spacer is removed from the preform after formation of the component.

29. The method according to claim 19 wherein at least one periphery bar is placed in the sealed enclosure prior to resin injection between the hard base tool and the control plate and adjacent an edge region of the preform to form a cavity in the sealed enclosure to receive the injected liquid resin.

30. The method according to claim 19 wherein the hard base tool and the flexible bagging blanket enclosing the preform are heated, pressurized and depressurized in an autoclave, the liquid resin being ducted to and from the enclosure through the shell of the autoclave.

31. The method according to claim 19 wherein the preform is partially drilled to receive said at least one spacer while laid up and maintained in a desired position on the hard base tool, the preform being then raised from the tool to avoid damage to the tool while drilling is completed.

32. The method according to claim 19 wherein the control plate is pre-drilled to receive a drill bush through which a drill passes subsequently to drill the preform.

33. The method according to claim 19 wherein, during resin injection, the control plate is prevented from lifting away from the preform.

34. The method according to claim 19 wherein, during resin injection, the control plate is caused to lift away from the preform to allow resin to flow across the adjacent face of the preform.

35. The method according to claim 19 wherein a predetermined quantity of liquid resin is injected into the sealed enclosure.

36. The method according to claim 19 wherein the liquid resin is injected into the sealed enclosure until the flow rate of the resin decreases at a predetermined ambient pressure within the autoclave.

37. The method according to claim 19 including the step of introducing, for the control plate, at least one reinforcing insert so disposed as to coincide with said at least one spacer such that compression forces imposed on the control plate by the spacer are at least partially borne by the reinforcing insert.

* * * * *

UNITED STATES PATENT AND TRADEMARK OFFICE
CERTIFICATE OF CORRECTION

PATENT NO. : 8,083,984 B2
APPLICATION NO. : 12/444243
DATED : December 27, 2011
INVENTOR(S) : William James Trevor Millar It is certified that error appears in the above-identified patent and that said Letters Patent is hereby corrected as shown below:

Column 5, line 53, "IVENTION" should read as --INVENTION--.

Column 8, line 28, the last word of the line "pints" should read as --pins--.

Claim 3, column 11, line 12, "adapted to in use to be connected" should read as --adapted in use to be connected--.

Claim 17, column 11, line 57, in the phrase "lower face of the of the control plate," the second "of the" should be deleted.

Signed and Sealed this
Fifteenth Day of May, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,083,984 B2 | Page 1 of 1 |
| APPLICATION NO. | : 12/444243 | |
| DATED | : December 27, 2011 | |
| INVENTOR(S) | : William James Trevor Millar | |

It is certified that error appears in the above-identified patent and that said Letters Patent is hereby corrected as shown below:

In the Claims

In claim 2, at column 11, line 5, the term "resin injection port" should be replaced by the term --liquid resin inlet--

Signed and Sealed this
Sixteenth Day of December, 2014

Michelle K. Lee
*Deputy Director of the United States Patent and Trademark Office*